ALFRED E. LEININGER
MARVIN E. LICKERT
INVENTORS

BY John C. Faulkner
John J. Goethel

ATTORNEYS

3,162,279
PLASTIC-METAL JOINT
Alfred E. Leininger, Ypsilanti, and Marvin E. Lickert, Rochester, Mich., assignors to Ford Motor Company, Dearborn, Mich., a corporation of Delaware
Filed Oct. 9, 1961, Ser. No. 143,688
12 Claims. (Cl. 189—36.5)

This invention relates to continuous surface joints between sheet metal and synthetic material panels and to methods for making the same.

The adaption of plastic material, such as molded glass fiber reinforced laminates and reinforced phenolic plastics in sheet or panel form, to the fabrication of automotive vehicle bodies has been slow to win acceptance. The desirability of these materials, particularly with respect to their resistance to corrosion, is well-known. These materials are, however, difficult to handle on a high volume production line basis. Sheet metal panels can be joined by rapid fire spot welding techniques. Plastic panels cannot be joined directly to sheet metal or to other plastic panels by such rapid production techniques. The usual practice is to adhesively bond the synthetic panel to the sheet metal panel. Present bonding techniques cannot compete with spot welding techniques for high volume production of vehicle bodies.

It is, therefore, an object of the present invention to provide synthetic panels having preattached metal welding strips which willl permit the panels to be handled on a vehicle body production line with the same facility that sheet metal panels are handled. That is, the joinder of the synthetic panels with the preattached weld strips to sheet metal panels may be done by spot welding or any other production line technique ordinarily used in the joinder of two sheet metal panels. An additional finishing operation at the joint may be required. Outside of this minor disadvantage, the present invention greatly widens the range of synthetic material-metal combinations available to stylists in automotive and many other design fields.

Other objects, advantages and features of construction of the present invention will be made more apparent as this description proceeds, particularly when considered in connection with the accompanying drawing, wherein.

Figure 1:
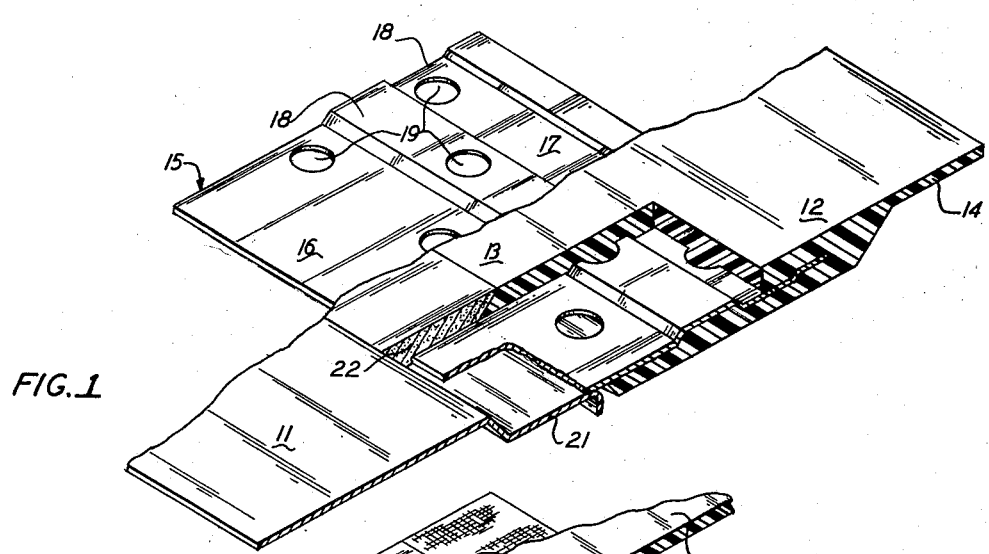
Figure 2:
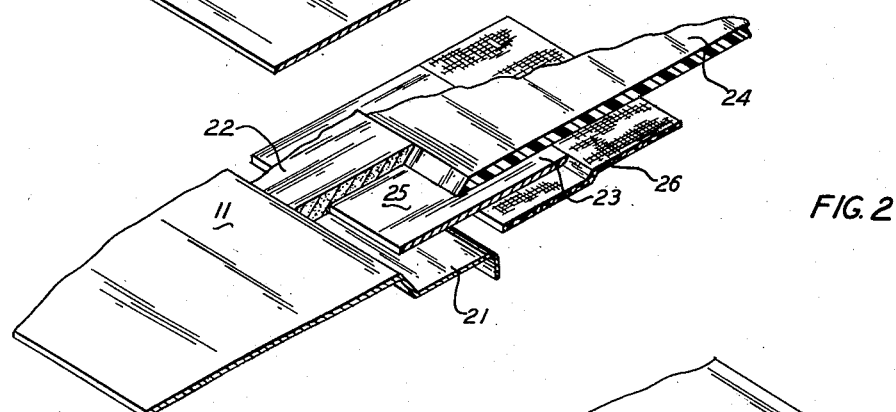
Figure 3:
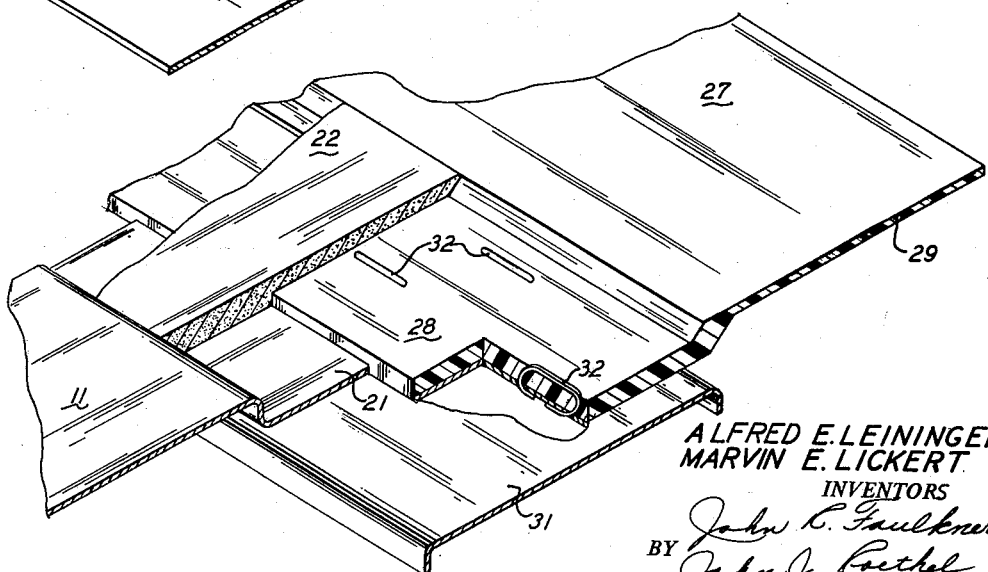

FIGS. 1, 2 and 3 are fragmentary perspective views each illustrating an embodiment of the present invention.

Referring now to FIG. 1, there is shown a continuous surface joint between a sheet metal panel 11 and a synthetic material or plastic panel 12.

It will be noted that the peripheral or marginal portion 13 of the panel 12 is somewhat thicker than the panel thickness at 14. Associated with the synthetic material or plastic panel 12 is a metal weld strip 15, the weld strip 15 having a section 16 forming a substantially coplanar extension of the panel 12 and a section 17 adapted to be molded into the thicker portion 13 of the panel. The section 17 of the weld strip 15, the portion which is molded within the panel 12, has a series of offset channel sections 18 of minor depth and a series of perforations 19 spaced in any convenient pattern. The channel sections 18 and perforations 19 are effective to provide an interlock between the panel and weld strip to prevent separation in a direction parallel to the plane of the panel, This, as will be understood, is normally the direction of greatest load when the panel 12 is joined with another panel, such as the panel 11.

The panel 11 has an offset flange 21, hereafter defined as a weld flange. This weld flange 21 is adapted to receive in overlapping relationship the exposed section 16 of the weld strip 15. The weld strip 15 may be secured to the weld flange 21 in any convenient manner, such as by spot welding or any other production line techniques.

It will be understood that the weld flange 21 on the panel 11 will be offset to a sufficient degree so that the surface of the panels 11 and 12 will lie in substantially flush relationship, if desired, when the weld strip 15 has been welded to the weld flange 21. This, of course, leaves a gap between the surface of the panels 11 and 12 which must be filled in to provide a continuous surface. This gap may be filled by the application of an epoxy base alum solder. This is represented at 22 in the drawing. The solder joint is then metal finished, primed and painted by accepted methods to form a finished surface. Of, if desired, a suitable molding strip could cover the gap beween the panels 11 and 12.

With reference to the embodiment of the invention disclosed in FIG. 2, a different technique for assembling the weld strip to the plastic panel is illustrated. In this embodiment, the weld strip, herein designated 23, comprises a flat strip of metal not having any perforations or offset channels therein. The synthetic material panel, therein designated 24, is of uniform thickness out to its marginal edge. The panel and weld strip are adhesively bonded to each other leaving a sufficient marginal section 25 exposed for welding to the weld flange 21 on the sheet metal panel 11. To reinforce the retention of the weld strip 23 to the panel 24, a glass fiber laminate 26 is positioned against the underside of the weld strip 23 and the pan panel 24 so as to overlie a substantial portion of each. The glass fiber laminate is then adhesively bonded to both the weld strip and the panel.

As in the previously described embodiment, the exposed overlapping portions 25 of the weld strip 23 and the weld flange 21 of the panel 11 are covered by a suitable solder material which is then finished to form the continuous surface desired.

The embodiment of the invention illustrated in FIG. 3 differs slightly from the two previously described embodiments in that the synthetic material or plastic panel, herein designated 27, is provided with an offset marginal portion 28 of slightly greater thickness than the normal panel thickness as indicated at 29. In this embodiment, the weld strip, herein designated 31, is a channel section and is completely exposed with respect to the underside of the panel 27. The weld strip 31 is adapted to be secured to the offset marginal portion of the panel 27 by mechanical fastening means. As indicated at 32, the metal weld strip 31 may be secured to the panel 27 by metal staples.

The weld flange 21 of the sheet metal panel 11 overlies the marginal portion of the weld strip 31 extending beyond the edge of the plastic panel 27 and is spot welded or otherwise suitably secured thereto, as in the previously described embodiments.

The filler material or solder 22 is then applied to the joint to cover the weld flange 21, the marginal offset portion 28 of the panel 27 and the mechanical fastening means 32 projecting therefrom to provide the desired continuous surface.

It will be understood that the invention is not to be limited to the exact construction shown and described, but that various changes and modifications may be made without departing from the spirit and scope of the invention as defined in the appended claims:

We claim:

1. A continuous surface joint between a sheet metal panel and a synthetic material panel, comprising a metal weld strip, means securing said weld strip to said synthetic material panel, a weld flange on said sheet metal panel, said metal weld strip and flange being welded together, and filler material covering the surface irregularities contiguous to said weld strip and flange to complete the continuity of said surface joint.

2. A continuous surface joint according to claim 1 in which said metal weld strip has a section thereof molded within said synthetic panel and a further section thereof exposed for welding to the weld flange on said sheet metal panel.

3. A continuous surface joint according to claim 1 in which the filler material comprises an epoxy base alum solder.

4. A continous surface joint according to claim 1 in which the means securing said metal weld strip to said synthetic panel comprises an adhesive material, said adhesive material being interposed between and bonding a section of said metal weld strip to an overlapping section of said synthetic panel, the adhesive bond being reinforced by a glass cloth laminate which is also adhesively bonded to said weld strip section and a section of synthetic panel adjacent said overlapping section.

5. A continuous surface joint according to claim 1 in which the means securing said weld strip to said synthetic panel comprises a mechanical fastening means, said mechanical fastening means projecting through a section of said metal weld strip and an overlapping section of said synthetic panel.

6. A continuous surface joint according to claim 5 in which the mechanical fastening means securing said weld strip overlapping section to said synthetic panel comprises staples.

7. A continuous surface joint between a sheet metal panel and a synthetic panel, comprising a metal weld strip, means securing said weld strip to said synthetic material panel in extended, offset, parallel relationship to one surface thereof, a weld flange on said sheet metal panel in extended, offset, parallel relationship to one surface thereof, said metal weld strip and flange being offset from the same surface of said joint and being welded together in overlapping relationship, mutually adjacent coplanar portions of said panels being spaced from each other, and filler material covering the surface irregularities between said coplanar portions to complete the continuity of said one surface.

8. The method of making a continuous surface joint between a sheet metal panel and a synthetic material panel, comprising the steps of securing a weld strip to the synthetic material panel, welding said weld strip to a weld flange of said metal panel, filling the surface irregularities at the joint between said panels with a filler material, and then finishing said filler material to a flush relationship with said metal panel and synthetic panel surfaces to provide the joint therebetween having a continuous surface.

9. The method of making a continuous surface joint between a sheet metal panel and a synthetic material panel according to claim 8 in which the step of securing the weld strip to the synthetic material comprises placing the metal weld strip in position to have a first section thereof forming a substantially coplanar extension of said synthetic mateiral panel and a second section thereof overlapped by said synthetic material panel, then bonding said second section to said synthetic material panel, and then reinforcing the bonded section by a synthetic laminate extending from said synthetic material panel over said second section, said first section being left exposed for welding to the weld flange on said sheet metal panel.

10. The method of making a continuous surface joint between a sheet metal panel and a synthetic material panel according to claim 8 in which the step of securing the weld strip to the synthetic material comprises placing the metal weld strip in position to have a first section thereof forming a substantially coplanar extension of said synthetic material panel, and then mechanically securing a second section of said welding strip to said synthetic material panel, said first section being left exposed to be welded to the weld flange on said sheet metal panel.

11. The method of making a continuous surface joint between a sheet metal panel and a synthetic material panel according to claim 8 in which the step of securing the weld strip to the synthetic material comprises placing the metal weld strip in position to have a first section thereof forming a substantially coplanar extension of said synthetic material panel, and the mechanically stapling a second section of said welding strip to said synthetic material panel, said first section being left exposed to be welded to the weld flange on said sheet metal panel.

12. The method of making a continuous surface joint between a sheet metal panel and a synthetic material panel, comprising the step of placing a metal weld strip in position to have a section thereof forming a substantially coplanar extension of said synthetic material, molding said weld strip directly into said synthetic material for retention thereby with said section exposed, welding said exposed section to a weld flange on said sheet metal panel in overlapping relation thereto, filling the surface irregularities at the overlap of said weld strip and weld flange with a filler material, and then finishing said filler material to a flush relationship with said panels to provide the latter and the joint therebetween with a continuous surface.

References Cited in the file of this patent

UNITED STATES PATENTS

| | | |
|---|---|---|
| 2,511,168 | Martin et al. | June 13, 1950 |
| 2,600,220 | Doelker et al. | June 13, 1950 |